June 26, 1956 F. S. WREFORD ET AL 2,752,412
WELDING CABLE WINDING
Filed May 1, 1951
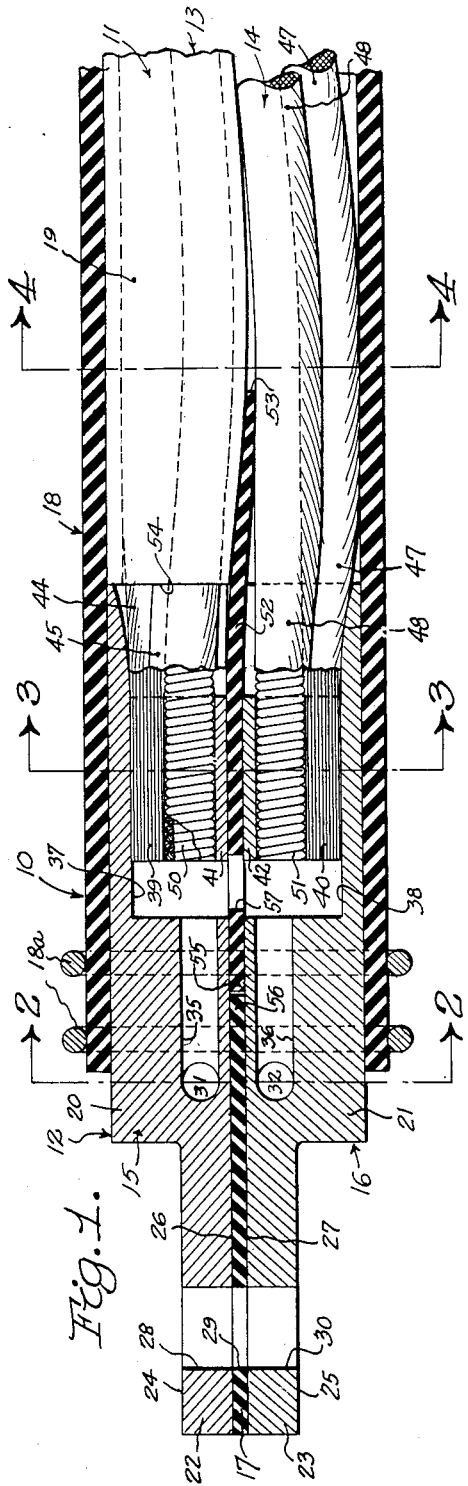
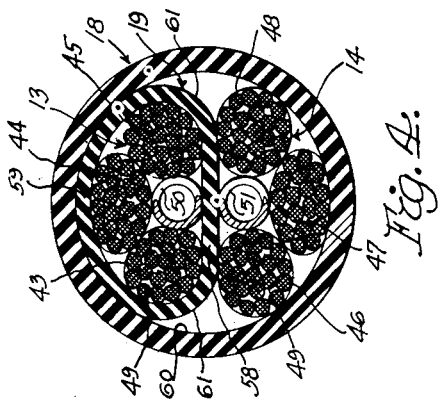
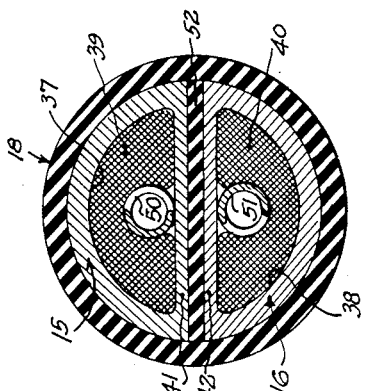
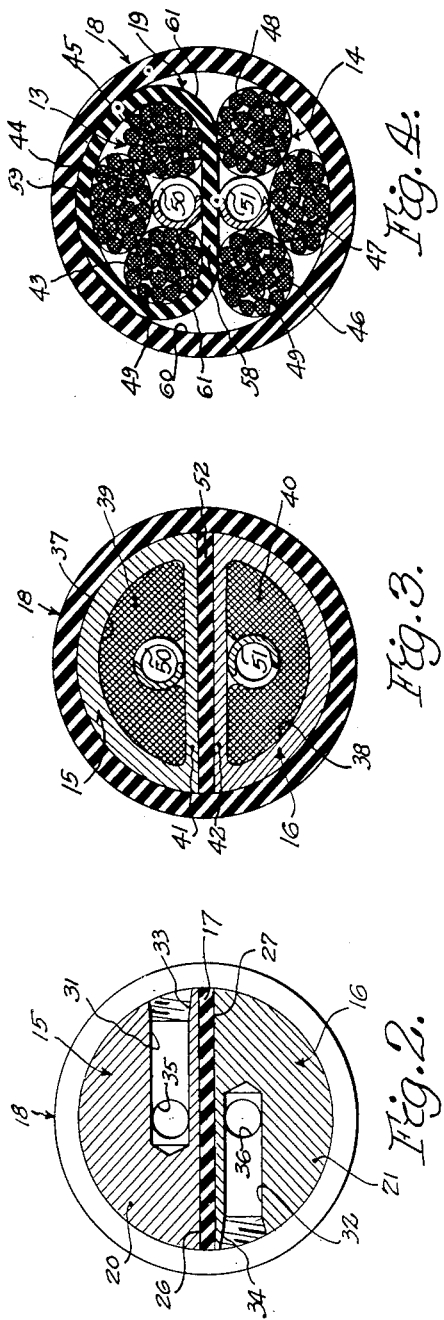
Inventors
Frederick S. Wreford
John S. Wreford
By Barthel + Bugbee attorneys

United States Patent Office 2,752,412
Patented June 26, 1956

2,752,412
WELDING CABLE WINDING

Frederick S. Wreford and John S. Wreford, Detroit, Mich.; Annie A. M. Wreford, executrix of the estate of said Frederick S. Wreford, deceased, assignors to Gar Wood Industries, Inc., Wayne, Mich., a corporation of Michigan Application May 1, 1951, Serial No. 223,912

1 Claim. (Cl. 174—15)

This invention relates to electric welding cables and, in particular, to so-called windings for such cables.

One object of this invention is to provide an electric welding cable winding wherein two minutely stranded conductor units or assemblies are separated from one another within the cable casing or hose by enclosing one of the conductor units in an auxiliary or additional hose or tubular insulator, so that the two conductors are completely isolated from one another without the danger of broken strands of one conductor working their way past the separator or insulating strip of the cable into contact with the other conductor and thereby causing short circuiting of the cable.

Another object is to provide an electric welding cable winding employing two conductors, each of which is composed of minute wire strands, the conductors being of approximately semicircular cross-section and one of them being mounted within a tubular insulator inside the cable hose or casing, the portion of the tubular insulator between the two conductors being approximately in the diametral plane of the cable and approximately flat so as to reduce the reactance between the conductors to a minimum and consequently to reduce the "kick" between the two conductors to a minimum when the circuit is closed in making a weld.

Another object is to provide an electric welding cable winding of the foregoing character wherein the conductors are loosely packed in their respective hoses or tubular insulators so that ample space is provided for the circulation of cooling water to carry away the high heat developed during the welding operations, the invention making it possible to cause water to flow toward the welding gun along one side of the cable and back from the welding gun along the other side of the cable, the cooling water in one direction passing through the tubular insulator inside the cable hose and therefore being completely isolated from the water traveling in the other direction, thereby preventing electrolysis of the cable conductors by the presence of electrolytes such as salt in the cooling water.

Other objects and advantages of the invention will become apparent during the course of the following description of the accompanying drawings, wherein:

Figure 1 is a central longitudinal vertical section through a welding cable according to one form of the invention, showing the cable winding connected to the terminals of a conventional cable head, the cable winding itself being shown mainly in side elevation;

Figure 2 is a cross-section taken along the line 2—2 in Figure 1, showing details of the water cooling passageways for conducting cooling water to the cable winding;

Figure 3 is a cross-section taken along the line 3—3 in Figure 1, showing the manner in which the cable winding conductors are secured to the cable head terminals; and Figure 4 is a cross-section taken along the line 4—4 in Figure 1, showing the arrangement of the cable conductors in the cable winding.

Welding cables for connecting so-called spot-welding guns to the transformers providing current for resistance welding operations have hitherto presented certain unsolved problems, especially in the case of double conductor cables. Where two cable conductors are contained within the same casing or hose next to one another, the use of such cables has been accompanied by violent jerks or kicks resulting from the reaction of one conductor relative to the other conductor when the electric circuit is closed during welding operations. Since the current passing through these conductors is frequently as high as 50,000 to 60,000 amperes at a relatively low voltage, this kick has shortened the life of such cables considerably because of the mechanical strain imposed thereon by the kick of the cable. Due to the large amount of current carried by such cables, a great amount of heat is developed during welding operations, and it has accordingly been necessary to cool such cables by circulating cooling water through them.

Due to the low voltage of the current carried and to the comparative purity of the water ordinarily available for cooling purposes, there is little loss of current through the water even though the water circulates between the opposite halves of the cable winding carrying the conductors of opposite instantaneous polarity. Occasionally, however, where hard water conditions are encountered in the locality where welding is being carried out, and the water is treated to acidify it or to add phosphates to it in order to reduce the deposit of calcium carbonate or "boiler scale," the circulation of the water between the opposite sides of the cable causes electrolysis to take place between the opposing cable conductors, with consequent attack of the conductor metal and a resulting deterioration of the cable. This is particularly true where a separator or central insulator strip is loosely mounted in the cable casing or hose so as to permit the flow of water between the opposing conductors. In such cables, moreover, it has ordinarily been necessary to cause water to flow to the welding gun in the same direction through both sides of the cable and to dispose of the water by a separate hose attached to the forward end of the cable near the welding gun.

The present invention provides a cable winding wherein one of the cable conductors is mounted inside a tubular insulator extending from one end of the cable to the other so as to completely isolate the two conductors and to permit the use of the tubular insulator to carry water in one direction while the cable hose or casing carries the water in the opposite direction. This simplifies the construction and arrangement at the welding gun so that the welder or operator is less hampered in his work than he was hitherto by the presence of the water hose. Moreover, the complete isolation of one of the welding conductors by placing it within the tubular insulator positively prevents any of its strands from coming into contact with any of the strands of the other conductor and causing a short circuit, such strands becoming broken as the cable is repeatedly flexed while the welding gun is moved around during welding operations.

Moreover, since the water surrounding and flowing along one conductor never comes directly into contact with the water flowing along the other conductor, no electrolysis can result from the presence of electrolytes in the water and consequently no deterioration of the cable occurs as a result of such electrolysis, even when the water has had chemicals added to it in order to reduce the deposit of calcium carbonate from hard water. Finally, the fact that the two conductors are of approximately semi-circular cross-section when they are assembled together inside the cable casing or hose, the one within the tubular insulator and the other outside it but still within the hose, causes the portion of the tubular insulator lying between the two conductors to be in the form of an approximately flat strip of insulating material which is thinner than the so-called separators customarily used in such cables to separate the two conductors, thereby further reducing the reactance and consequently still further reducing the "kick" of the cable.

Referring to the drawings in detail, Figure 1 shows one end of a welding cable, generally designated 10, as consisting generally of a cable winding, generally designated 11 connected to a cable head, generally designated 12. The cable winding 11 consists of conductors, generally designated 13 and 14, and the cable head 12 of terminals 15 and 16 separated by an insulating strip 17 of fiber, hard rubber, synthetic plastic or the like. The cable winding 11 and the rearward portion of the cable head 12 are enclosed with a flexible, resilient cable hose or casing 18 of rubber, synthetic rubber, synthetic plastic or the like and secured in position by clamping rings, wires or bands 18a so as to prevent leakage of water. The conductor 13 is in turn enclosed in a flexible, resilient tubular insulator 19 of rubber, synthetic rubber, synthetic plastic or the like placed inside the cable hose 18 and occupying approximately one-half of the interior thereof, as described below.

There are ordinarily two cable heads 12 to each cable 10, one on each end of the cable winding 11. These cable heads are conventional, any suitable type of head being capable of being used. The particular cable head 12 is substantially the same as that shown in the Wreford Patent No. 2,504,777, issued April 18, 1950, for Welding Cable. Each of the terminals 15 and 16 of the cable head 12 has a semi-cylindrical rear portion 20 or 21 and a forward portion 22 or 23 with a flattened cutaway portion 24 or 25. The semi-cylindrical terminals 15 or 16 have flat inner surfaces 26 and 27 engaging opposite sides of the flat insulating strip 17 (Figure 2). Transverse holes 28, 29 and 30 for a bolt (not shown) are formed in the terminal 15, the insulating strip 17 and the terminal 16 respectively.

The terminals 15 and 16 are provided with transverse bores 31 and 32 extending inward from ports 33 and 34 on opposite sides (Figure 2) which are preferably threaded for connection to water-cooling hoses (not shown). At their inner ends, the transverse bores 31, 32 communicate with longitudinal or axial bores 35, 36 which lead through the rearward terminal portions 20, 21 to pockets 37, 38 in which the ends 39 and 40 of the conductors 13 and 14 are secured by a combination of heat and pressure applied upon bridge members 41 or 42 extending across the respective pockets 37, 38 (Figure 1). Solder is optionally placed in the pockets 37 or 38 adjacent the inner ends of the bridge members 51 or 42 and the terminal heated so that the solder melts and flows through the interstices between the fine hair-like wires of the cable conductors 13, 14 while pressure is exerted upon the bridge members 41 and 42 in a suitable press. The ends 39 or 40 of the conductors 13 or 14 are of approximately semi-circular cross-section (Figure 3). This procedure has been described in the above-mentioned Wreford Patent 2,504,777 of April 18, 1950.

The conductors 13 and 14 of the cable winding 11 preferably consist of a plurality of rope-like members 43, 44, 45 or 46, 47, 48 (Figure 4) which in turn are composed of multiple cord-like members 49 made up of fine hair-like strands of wire, usually of copper, which are twisted together. The cord-like members 49 are twisted spirally to form their respective rope-like members 43 to 48 inclusive, and these are then combined in the manner shown to form the conductors 13, 14 of approximately semi-circular cross-section.

A tightly coiled wire spring conduit 50 or 51 is arranged in the space adjacent the axis of the cable 10, this construction being adapted to conduct cooling water through the opposite halves of the cable winding consisting of the conductors 13, 14 and at the same time to permit leakage of water through the minute spaces between the convolutions of the spring-like conduits 50, 51 while preventing the entrance of broken strands or short pieces of wire into the cooling system. The spring-like conduits 50, 51 thus serve also as strainers, to exclude these wire splinters, and their flexible construction enables the cable 10 to be bent freely.

Interposed between the tubular insulator 19 and the conductor 14 is a separator strip 52, the rearward end 53 of which lies rearwardly of the forward end 54 of the tubular insulator 19, whereas the forward end 55 of the separator strip 52 substantially abuts the rearward end 56 of the insulating strip 17. Between its ends 53 and 55, the separator strip 52 extends between the bridge portions 41 and 42 (Figure 3) of the terminals 15 and 16 and between the flat surfaces 26 and 27 thereof. The separator strip 52 is provided with a hole 57 through which water can circulate between the opposite pockets 37 and 38. Since the welding current is of low voltage, usually less than 20 volts and often in the neighborhood of 6 volts, and since the ordinary tap water with which these cables are cooled is substantially free from electrolytes, there is no danger of short-circuiting the conductors 13 and 14 of the cable 10 through the cooling water. Within the body of the cable winding 11, however, it will be evident from Figure 4 that the cooling water passing through the conduit 50 within the separator tube 19 is completely isolated from the cooling water passing through the conduit 51 of the cable conductor 14. In this manner, the conduit 50 can be used to carry cooling water in one direction and the conduit 51 to carry cooling water in the opposite direction.

The tubular insulator 19 has an approximately flat inner diametral conductor-separating portion 58 (Figure 4) directly separating the conductors 13 and 14 and insulating them from one another at their points of nearest approach. The tubular insulator 19 also has an outer conductor-retaining portion 59 of arcuate cross-section closely fitting the inner bore 60 of the hose 18. The arcuate portion 59 is connected to the flat diametral portion 58 by rounded portions 61. Thus, when the cable winding 11 is assembled within the cable hose or casing 18, the separator tube 19 has a cross-section which is roughly semi-circular.

In order to increase the flexibility of the cable 10, the cable winding 11 including its conductors 13 and 14 and separator tube 19 is twisted spirally as a unit at intervals of approximately 9 inches for every complete turn. This twisting is done while the cable winding is being assembled and prevents the flat separator portion 58 of the separator tube 19 from always being presented in the same plane. Thus, the hose can be flexed easily, a flexibility being imparted by this spiral twisting which minimizes the resistance of the separator portion 58 to twisting in the direction of its own plane or its own edges.

In assembling the cable 10 of the present invention, the cable conductors 13 and 14 are secured in their respective pockets 37 and 38 in the terminals 15 and 16 in the manner previously described, the conductor 13 together with its conduit 50 is threaded through its tubular insulator 19 from one end to the other, the assembly of the cable winding 11 with the cable heads 12 being then twisted to impart the above-described flexibility. The individual strands of the cable windings are loosely packed to permit the flow of cooling water between them. After this, the cable hose or casing 18 is drawn over one of the cable heads 12 and over the cable winding 11 to the other cable head 12, after which it is secured in position by the clamping rings or bands 18a.

The cable 10 is now ready for use when the water connections have been made to the ports 33 and 34, when the welding gun has been secured to the forward portions 22, 23 of the terminals 15, 16 by means of a clamping bolt (not shown) inserted through the aligned bolt holes 28, 29, 30 (Figure 1), and when the cable head 12 at the opposite end of the cable 10 has been connected to a suitable welding transformer. The lugs projecting from the welding gun tightly engage the flattened cutaway portions 24 and 25 so as to transmit with a minimum of resistance the enormous welding current which the cable is called upon to conduct, this, as previously stated, often being in the neighborhood of 50,000 to 60,000 amperes.

In the operation of the cable 10, the welder carries his spot-welding gun to and from the various portions of his work, such as, for example, to the various portions of the body of an automobile which is under construction. The cooling water is turned on, the current circuit to the welding transformer is closed, and the welding operations are conducted in the ordinary way. The cooling water circulates freely through the passageways 31, 32, and 35, 36 of the welding cable heads 12 into the pockets 37, 38 of the terminals 15, 16 and between these pockets through the holes 57 in the separator strip 52. The water continues through the spring-like conduits 50, 51, flowing out through the interstices between the convolutions thereof and between the individual strands of the cable conductors 13 and 14, cooling the conductors and removing the heat which develops as a result of welding operations. Since the welding current is ordinarily 60 cycle alternating current, the wire strands move toward and away from one another alternately in rapid succession, causing the cooling water to move in and out through the spaces between the strands. The cooling water which passes through the separator tube 19, however, is completely separated from that passing outside the tubular insulator 19 within the cable winding 11, so that the water may move in opposite directions through the conduits 50 and 51.

Due to the relatively thin conductor-separating portion 58 of the tubular insulator 19 which lies between the conductors 13 and 14, and due to the approximate flatness of their opposing surfaces, the reactance of the cable is kept at a minimum. This results in the minimum amount of "kick" or reaction between the opposing conductors 13 and 14 of opposite instantaneous polarity, and gives increased life to the cable, achieving the new results stated immediately after the brief description of the drawings herein and in the objects stated above.

What I claim is:

A flexible electric welding cable winding comprising a tubular casing of flexible insulating material having a bore therethrough of approximately circular cross-section, a single tubular welding current conductor insulator of flexible heat-resisting insulating material and of approximately semi-circular cross-section loosely and relatively slidably mounted within and extending substantially end-to-end of said casing, and a pair of flexible electrical welding current conductors of approximately semi-circular cross-section disposed side by side within said casing with their flatter sides facing one another in transversely-spaced relationship, said tubular insulator having a relatively flat conductor-separating portion lying between said conductors and extending across substantially the diametral portion of said casing in the space between said flatter sides of said conductors, said tubular insulator also having an approximately semi-cylindrical conductor-retaining portion in contact with the inside wall of said casing, one only of said conductors being disposed inside said tubular insulator and substantially filling the entire interior space thereof and the other conductor being disposed outside said tubular insulator and substantially filling the remaining space outside said tubular insulator and inside said casing, each of said conductors being composed of loosely-packed multiple strands of minute wire separated from one another by minute interstices forming cooling liquid passages.

References Cited in the file of this patent

UNITED STATES PATENTS

| 2,433,588 | Wreford | Dec. 30, 1947 |
| 2,440,668 | Tarbox | Apr. 27, 1948 |
| 2,504,777 | Wreford | Apr. 18, 1950 |

FOREIGN PATENTS

| 620,502 | Great Britain | Mar. 25, 1949 |